United States Patent [19]
Allen et al.

[11] 3,814,130
[45] June 4, 1974

[54] FLUID EXTRACTORS

[75] Inventors: Charles H. Allen, Pasco; Willfred F. Smith, Richland, both of Wash.

[73] Assignee: Battelle Development Corporation, Columbus, Ohio

[22] Filed: June 27, 1972

[21] Appl. No.: 266,576

[52] U.S. Cl............ 137/625.28, 251/7, 251/9
[51] Int. Cl............................. F16k 7/06
[58] Field of Search............ 251/7, 8, 9, 10, 4, 331; 137/625.28

[56] References Cited
UNITED STATES PATENTS
3,095,905  7/1963  Glauber.................. 251/331 X
3,661,468  5/1972  Schwartzman.............. 251/331 X Primary Examiner—Arnold Rosenthal
Attorney, Agent, or Firm—Klarquist, Sparkman, Campbell, Leigh, Hall & Whinston

[57] ABSTRACT

Fluid extractors include tubular chambers surrounding and movable along pipes having ports and carrying pressers which project through the ports to press away from the ports adjacent portions of hoses in the pipes to open openings in the hoses for flow of fluid from the hoses into the chambers.

24 Claims, 9 Drawing Figures

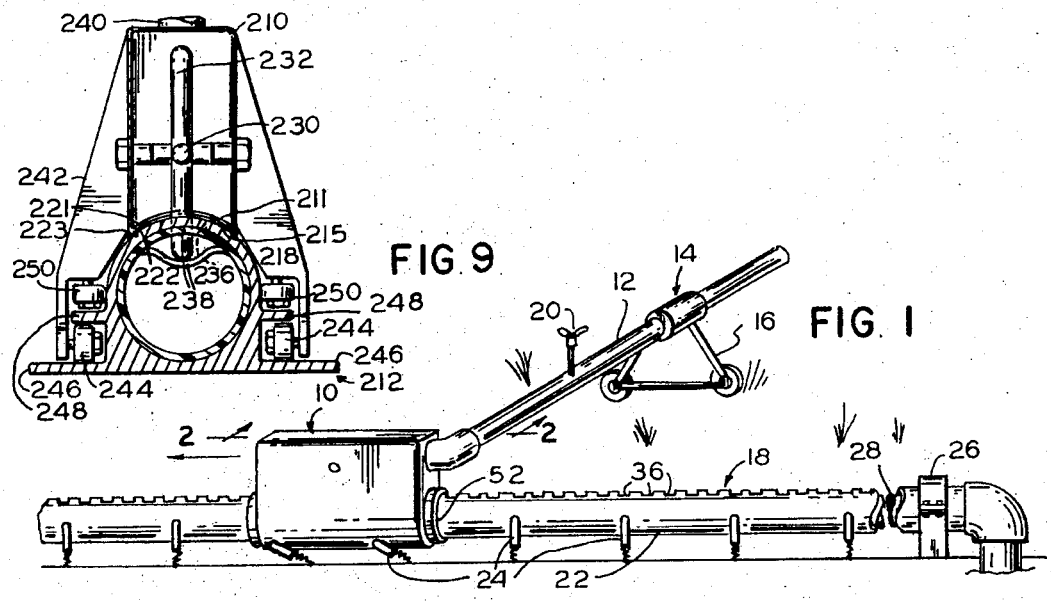
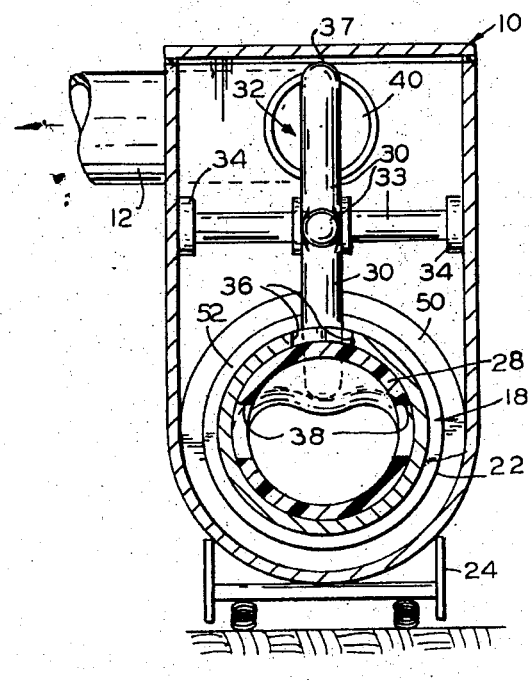
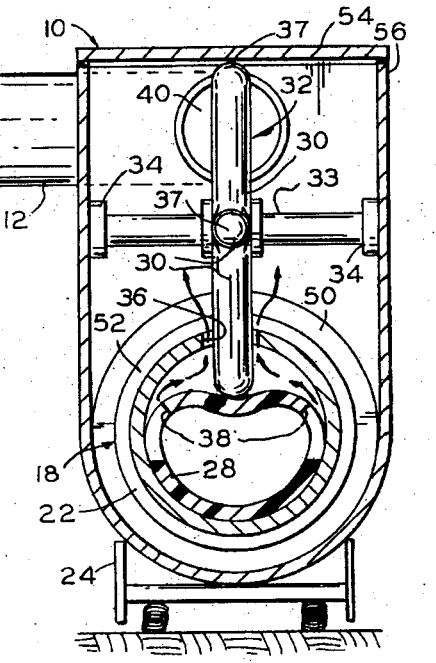

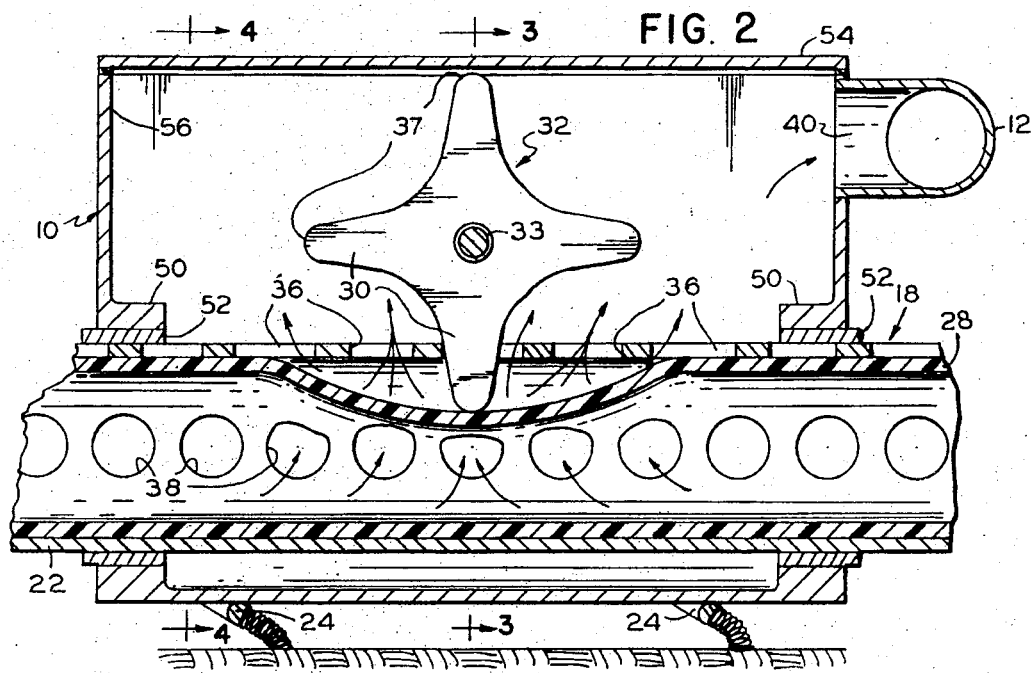
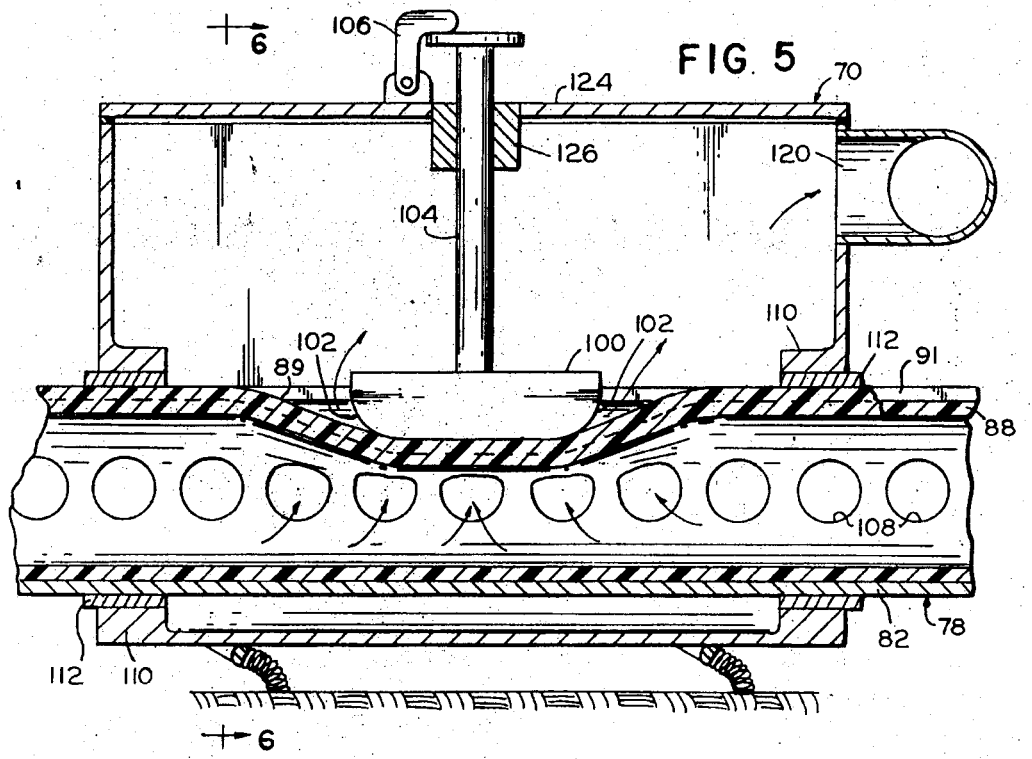

FLUID EXTRACTORS

This invention relates to fluid extractors, and more particularly to extractors for movable irrigation lines.

An object of the invention is to provide new and improved fluid extractors.

Another object of the invention is to provide new and improved extractors for movable irrigation lines.

A further object of the invention is to provide an extractor utilizing a hose with openings spaced therealong for supplying fluid to a line movable along the hose.

Another object of the invention is to provide apparatus for supplying water to a movable irrigation line wherein water under pressure in a hose presses openings in the hose against the inner wall of a pipe to close the openings and a presser carried by an extractor tube connected to the irrigation line presses portions of the hose radially inwardly sufficiently to open the openings and create a passage from the openings to a port of the pipe enclosed by the chamber.

Another object of the invention is to provide apparatus for supplying water to a movable irrigation line in which an extractor chamber connected to the line is moved in sealed relationship along the top of a pipe having openings spaced along the top and a presser carried with the extractor chamber is extended seriatim through the openings to flex at least partially a cylindrical sealing member extending along the pipe to move openings in the sealing member away from the pipe and form passages from these openings to the openings in the pipe, the openings in the sealing member being offset along the pipe from the openings in the pipe and being either holes or slits in the sealing member.

Another object of the invention is to provide apparatus for supplying water to an irrigation line including a presser slidable by an extractor chamber along a slot in an outer pipe to press adjacent portions of a hose in the pipe away from the slot and distort the hose to open openings in the hose so that water is supplied from the hose to the extractor chamber.

In the drawings:

FIG. 1 is a fragmentary perspective view of a fluid extractor forming one embodiment of the invention;

FIG. 2 is an enlarged, vertical, sectional view taken along line 2—2 of FIG. 1;

FIG. 3 is an enlarged, fragmentary, vertical, sectional view taken along line 3—3 of FIG. 2;

FIG. 4 is an enlarged, fragmentary, vertical, sectional view taken along line 4—4 of FIG. 2;

FIG. 5 is a fragmentary, vertical, sectional view of a fluid extractor forming an alternate embodiment of the invention;

Figure 7:
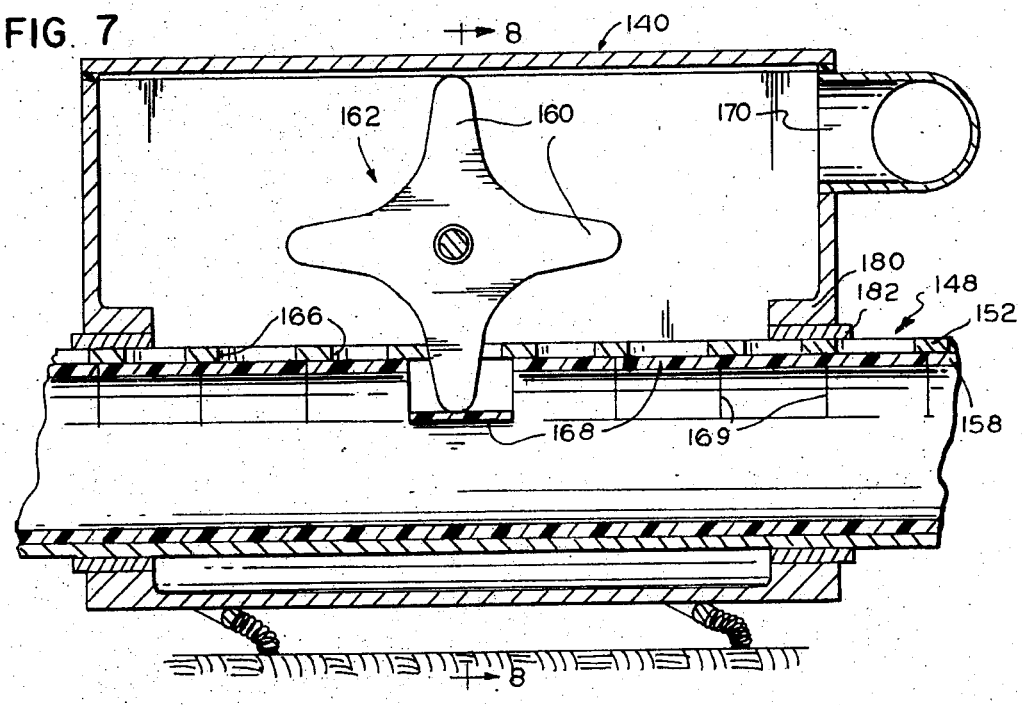
FIG. 7 is a fragmentary, vertical, sectional view of a fluid extractor forming an alternate embodiment of the invention.
Figure 6:
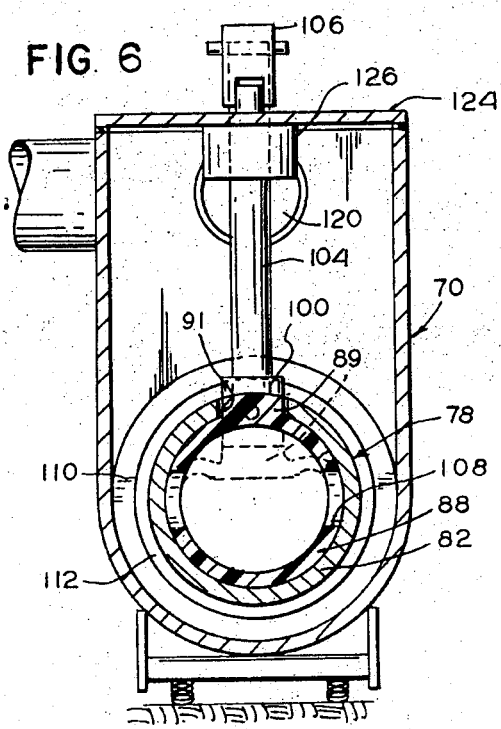
FIG. 6 is a fragmentary, vertical, sectional view taken along line 6—6 of FIG. 5.
Figure 8:
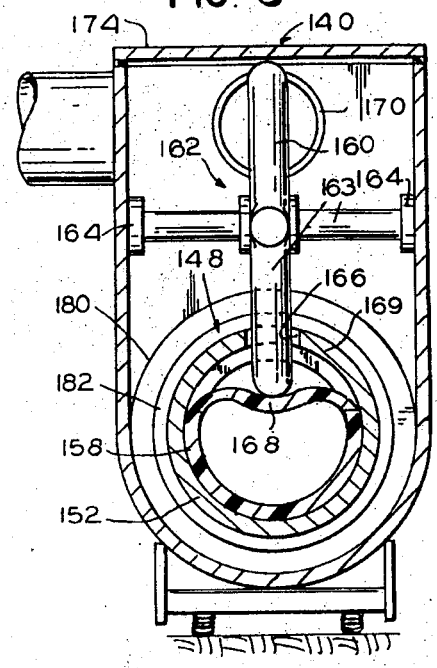
FIG. 8 is a fragmentary, vertical, sectional view taken along line 8—8 of FIG. 7; and, FIG. 9 is a fragmentary, vertical, sectional view of a fluid extractor forming an alternate embodiment of the ivention.

Referring now in detail to the drawings, there is shown in FIGS. 1–4 a fluid extractor forming one embodiment of the invention and including an extractor chamber 10 carried by a line pipe 12 supported by an irrigation line move 14 which has tractors 16 propelling the pipe 12 along a stationary supply line 18 supplied with water under pressure. The line pipe 12 has sprinklers 20 spaced therealong. The supply line 18 includes a cylindrical metal pipe 22 and a flexible hose 28 of rubber or other elastomer which fits closely in and extends along the pipe 22 from almost one end to almost the other end of the pipe 22. The hose 28 is supplied with water under pressure. The supply line 18 is supported by spring-biased pivotal yokes 24 and supported at its ends by fixed split clamps 26.

As the line pipe 12 is moved along the supply line 18, presser fingers 30 of a presser wheel 32 (FIGS. 2), which is rotatably mounted in the chamber 10 by a shaft 33 rotatable in bearings 34, are extended through openings 36 spaced along the top of the pipe 22. The spacing of the openings and the fingers are such as to give a rack and pinion effect to rotate the wheel. Rounded ends 37 of the fingers 30 press, against the pressure of the water, the adjacent upper portion of the hose 28 downwardly away from the inner surface of the pipe 22 to move holes 38 in the sides of the hose away from sealing engagement with the inner surface of the pipe. This opens the holes 38 and forms passages from the holes 38 to the openings 36 and the water flows therethrough from the supply line 18 into the extractor chamber 10 and through an exit port 40 to the pipe 12. As the wheel 32 is rolled along the pipe 22 and the fingers are withdrawn from the openings 36, the resiliency of the hose and the pressure of the water in the hose forces the portions of the hose surrounding the holes 38 back into sealing engagement with the adjacent abutment surfaces of the pipe 22. The holes 38 are in diametrically opposite pairs, and the pairs preferably are spaced apart a distance less than the spacing between the pipe openings 36, which are so spaced as to rotate the wheel 32 as the extractor chamber is slid along the pipe 22.

The extractor chamber 10 has aligned tubular portions 50 carrying elongated tubular seals 52 which fit closely on the supply pipe 22 and sealingly engage the pipe. Each seal 52 is of a length greater than the axial dimension of each opening 36 in the pipe 22. A cover 54 is removably secured to and sealed to the rest of the walls 56 of the generally tubular chamber 10.

The extractor chamber 10 may be supported on the ground by wheels, skids or crawler tracks (not shown). While the hose 28 shown has two rows of holes 38, for a small diameter hose 28, the holes 38 at the sides are omitted and a single row of holes (not shown) are provided in the top portion of the hose, these latter holes being positioned between and spaced from the openings 36. The upper portion of the hose 28, in width covering one-third to one-half of the circumference of the hose, is made of rubber having greater rigidity than the balance of the hose. This relatively rigid portion has a hardness value of approximately 85 durometers, the balance being approximately 30 durometers. Values that would be acceptable for hose of this type range from 70 to 90 durometers for the relatively rigid portion and from 20 to 40 for the remainder. As an alternative to the hose 38 composed entirely of elastomeric material, a lengthwise strip of metal can be incorporated in and bonded to the elastomer. These constructions provide inserts or sections that are relatively rigid and cover areas larger than the openings 36 in the pipe 22 to allow use of thin-walled hose and keep the hose from bulging at the openings 36 in the pipe 22.

EMBODIMENT OF FIGS. 5 AND 6

A fluid extractor forming an alternate embodiment of the invention includes an extractor chamber 10 carried by a line move (not shown) like the line move 14. The chamber 70 is moved along a supply line 78, which includes a hose 88 like the hose 28 except that the hose 88 has an integral top rib 89 fitting closely in and substantially filling a continuous top slot 91 in a supply pipe 82.

An elongated presser shoe 100 has rounded end portions 102 and carried by a push rod 104 releasably held down by a latch 106. The shoe is moved along the supply line 78 by the chamber and presses the adjacent portion of the hose 88 downwardly to deflect the portions surrounding holes 108 out of sealed engagement with the pipe 82 and form passages from the holes 108 to the slot 91.

The extractor chamber 70 has aligned tubular portions 110 carrying seals 112 which fit closely and sealingly on the pipe 82 and the arcuate top surface of the rib 89. The chamber 70 also has an exit port 120 and a removable cover 124 carrying a guide bushing 126.

EMBODIMENT OF FIGS. 7 AND 8

A fluid extractor forming an alternate embodiment of the invention includes an extractor chamber 140 identical with the chamber 10 (FIG. 1) and movable by an irrigation line move (not shown) along a supply line 148 having a pipe 152 like the pipe 22, and a flexible hose 158 normally fitting closely and sealingly in the pipe 152. The hose is supplied with water under pressure. Presser fingers 160 of a presser wheel 162 extend through openings 166 in the pipe and press arcuate strips 168 away from the pipe to open the interior of the hose to the openings 166, and water flows into the chamber and out through an exit port 170 to the irrigation line. The strips 168 are defined by circumferential slits 169 extending about one-half of the way around the hose. As each finger is retracted out of one of the openings 166, the strip 168 engaged springs back from its resiliency and the pressure of the water in the hose presses the strip into sealing engagement with the inner abutment surface wall of the pipe 152. The pressure of the water in the hose also tends to squeeze the adjacent faces of the slits into sealing engagement with each other.

The extractor chamber has bearings 164 journalling shaft 163 supporting the wheel 162, and also includes a sealed, removable cover 174. Tubular portions 180 of the chamber support tubular seals 182 of which each is longer than the dimension of the openings 166 axially of the pipe 152.

EMBODIMENT OF FIG. 9

A fluid extractor forming an alternate embodiment of the invention includes an extractor chamber 210 covering and sealed to cylindrical upper portion 211 of a rigid pipe 212, in which a flexible hose 218 like the hose 28 fits closely and sealingly, water under pressure being supplied to the hose 218. The chamber 210 has a generally rectangular recess 215 in inwardly projecting flange 221 surrounding bottom opening 223, and a sealing member 222 fits in the recess and sealingly engages a length of the upper portion of the pipe 212. Presser fingers 230 of a presser wheel 232 extend through openings 236 in the pipe and press arcuate strips 238 away from the pipe to open the interior of the pipe to the openings, and water flows into the chamber and out through an exit pipe 240 to an irrigation line.

The chamber 210 is moved along the pipe 212 with the irrigation line, and is supported by legs 242 rigidly secured to the chamber. The legs are supported by pairs of rollers 244 riding on flanges 246 forming a part of a base of the pipe. Upper flanges 248 prevent tilting of the chamber. Pairs of rollers 250 carried by the legs 242 engage the sides of the pipe 212 to center the chamber on the pipe. The weight of the chamber and the water therein press the seal against the pipe while allowing the seal to be slid along the pipe. The pipe 212 has a cylindrical interior, and may be formed by extruding.

What is claimed is:

1. In combination, an outer tube comprising a tubular wall with port means in the tubular wall,
   a sealing member of flexible sheet material positioned in the tube and having openings offset from the port means and pressed against the inner tubular wall of the tube,
   and a presser insertable through the port means to press the sealing member away from the port means to open the openings and form passages from the openings to the port means.

2. The combination of claim 1 wherein the sealing member is a hose positioned in the outer tube.

3. The combination of claim 2 wherein the openings are holes in the hose.

4. The combination of claim 2 wherein the openings are circumferential slits in the hose.

5. In combination,
   a hose having lateral openings therein at spaced points therealong,
   and closing means having abutment surfaces opposite the openings and against which the portions of the hose surrounding the openings are pressed into sealing engagement by fluid under pressure in the hose,
   the portions of the hose between the openings being adapted when pressed radially inwardly to flex the portions of the hose surrounding the openings away from the abutment surfaces to open the openings.

6. The combination of claim 5 wherein the openings are holes along one side of the hose.

7. The combination of claim 5 wherein the openings are arcuate slits positioned along one side of the hose.

8. The combination of claim 5 wherein the closing means comprises a tube fitting closely around the hose and having a discharge port offset from the openings in the hose.

9. The combination of claim 5 wherein the closing means comprises a tube having ports staggered relative to the openings and fitting closely on the hose.

10. The combination of claim 9 wherein the openings are holes positioned at least one side of the hose and the ports are spaced circumferentially from the openings.

11. The combination of claim 9 wherein the openings are arcuate slits in the hose positioned along one side of the hose and the ports are spaced longitudinally of the openings.

12. The combination of claim 8 wherein the tube has a slot extending along the top thereof and including a chamber, seals at the ends of the chamber engaging the tube, and a presser carried by the chamber and extending through the slot to press the adjacent portion of the hose radially inwardly.

13. The combination of claim 12 wherein the hose includes a flexible rib extending therealong and substantially filling the slot when not pressed by the presser.

14. In combination,
an elongated outer tube having lateral port means,
and an inner hose of flexible material in the outer tube and having lateral openings offset from the port means,
the portions of the inner hose surrounding the openings being adapted to be pressed into sealing engagement with adjacent portions of the outer tube by pressure of fluid in the hose,
the portions of the hose at the port means in the tube being adapted to be pushed inwardly to flex the portions of the hose surrounding the port means away from the tube to permit fluid to flow out of the hose and to and through the port means in the tube.

15. In an irrigation extraction device,
an elongated flexible hose having openings spaced therealong and supplied with water under pressure, support means including abutment surface means mounting the hose in a position in which the portions thereof surrounding the openings engage the abutment surface means to prevent flow of water through the openings,
a chamber movable along the hose and the support means, and actuator means movable with the chamber for distorting a portion of the hose to move a portion of the hose adjacent one of the openings away from the abutment surface means to permit flow of water from the pipe to the chamber.

16. The irrigation extraction device of claim 15 wherein the support means comprises a tube fitting closely on the hose and having openings offset from the openings in the hose to permit insertion of the actuator means into the tube to move the hose.

17. The irrigation extraction device of claim 15 wherein the openings are slits.

18. The irrigation extraction device of claim 17 wherein the slits are along portions of the circumference of the tube.

19. The irrigation extraction device of claim 16 wherein the openings are wide and the portions of the hose adjacent the openings normally sealingly engage the inner surface of the tube.

20. The irrigation extraction device of claim 19 wherein the openings in the tube are circumferentially offset from the openings in the hose.

21. The irrigation device of claim 15 wherein the openings are located in a first portion of the hose which has a predetermined stiffness the surrounding portions of the hose at the sides of the first portion of the hose being substantially less stiff than said predetermined stiffness.

22. The irrigation device of claim 22 wherein the surrounding portions of the hose have a durometer hardness of between 20 and 40 and the first portion of the hose has a durometer hardness of between 70 and 90.

23. The irrigation device of claim 21 wherein the first portion of the hose includes a stiffening element.

24. The combination of claim 1 wherein the outer tube and the sealing member are cylindrical and concentric.

* * * * *